United States Patent
Rygiel

(10) Patent No.: US 7,177,058 B2
(45) Date of Patent: Feb. 13, 2007

(54) BEAM DEFLECTION DEVICE

(75) Inventor: Reiner Rygiel, Altrip (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 0 days.

(21) Appl. No.: 10/915,497

(22) Filed: Aug. 10, 2004

(65) Prior Publication Data
US 2005/0036186 A1   Feb. 17, 2005

(30) Foreign Application Priority Data
Aug. 14, 2003   (DE) ................ 103 37 297

(51) Int. Cl.
*G02B 26/08* (2006.01)

(52) U.S. Cl. .................... 359/200; 359/212

(58) Field of Classification Search ........ 359/196–203, 359/212–214, 225–226, 845, 871, 872, 877–879, 359/280; 310/90.5, 309, 368–382; 250/234–236
See application file for complete search history.

(56) References Cited

U.S. PATENT DOCUMENTS

| | | | | |
|---|---|---|---|---|
| 4,386,823 A | * | 6/1983 | Musha | 369/44.11 |
| 4,479,051 A | * | 10/1984 | Musha | 250/202 |
| 4,544,228 A | | 10/1985 | Rando | 350/6.4 |
| 5,790,651 A | * | 8/1998 | Suzuki et al. | 379/327 |
| 5,881,598 A | * | 3/1999 | Sapuppo et al. | 74/5.6 E |
| 6,154,270 A | * | 11/2000 | Ozawa | 355/53 |
| 6,211,988 B1 | | 4/2001 | Engelhardt et al. | 359/201 |
| 6,346,992 B2 | * | 2/2002 | Melzer et al. | 358/1.5 |

FOREIGN PATENT DOCUMENTS

| | | |
|---|---|---|
| DE | 3329040 | 3/1984 |
| DE | 19654210 | 6/1998 |
| DE | 10135107 | 2/2003 |
| WO | 0055669 | 9/2000 |

OTHER PUBLICATIONS

Charles Cheever et al., "Ferrofluid Film Bearing for enhancement of rotary scanner performance.", SPIE vol. 1454, Beam Deflection and Scanning Technologies, 1991, pp. 139-151.
Gerald F. Marshall (editor), "Laser Beam Scanning", Marcel Dekker Inc., New York, 1985, pp. 149-191 and pp. 206-288.

* cited by examiner

*Primary Examiner*—Euncha P. Cherry
(74) *Attorney, Agent, or Firm*—Darby & Darby

(57) ABSTRACT

A deflection means which is rotatably and/or pivotably mounted in a bearing which comprises a Ferrofluid. The deflection means is part of an adjustable beam deflection device for deflecting a light beam. The deflection means is rotatable and/or pivotable about several axes.

17 Claims, 3 Drawing Sheets

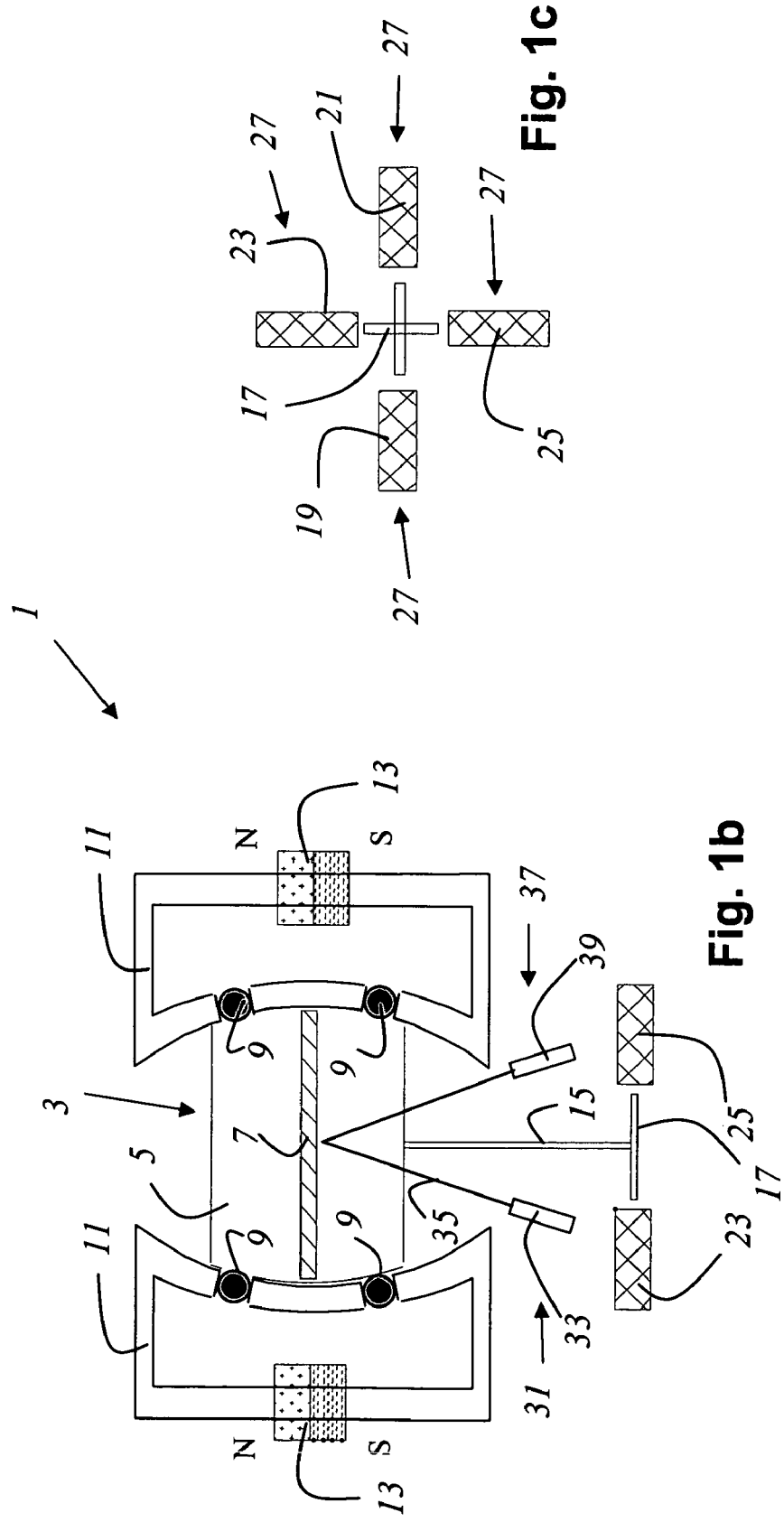

BEAM DEFLECTION DEVICE

CROSS REFERENCE TO RELATED APPLICATIONS

This application claims priority to German patent application 103 37 297.0, the entire disclosure of which is hereby incorporated by reference herein.

FIELD OF THE INVENTION

The invention concerns an adjustable beam deflection device for deflecting a light beam and a scanning microscope.

BACKGROUND OF THE INVENTION

Beam deflection devices are known in optics in a great variety of embodiments. Many beam deflection devices, in particular those in which rapid deflection of light beams is important, contain galvanometer mirrors. Among the disadvantages of beam deflection devices based on galvanometer mirrors are the large frictional losses in the ball bearings. As a consequence of its design, the return spring in the galvanometer positioning elements is not arranged symmetrically; with rapid oscillations in particular, this becomes perceptible as a difference in motion between the forward and return strokes of the galvanometer mirror.

Beam deflection devices that contain two mirrors arranged one after another, rotatable about mutually perpendicular rotation axes, are often used to deflect a light beam in two dimensions. In other beam deflection devices for two-dimensional deflection of a light beam, a single gimbal-mounted mirror is used. German Application DE 196 54 210 A1 discloses an optical arrangement for scanning a beam in two axes located substantially perpendicular to one another, in particular for use in confocal laser scanning microscopes. The optical arrangement contains two mirrors rotatable, each by means of a drive system, about mutually perpendicular axes; and a further mirror that is associated, nonrotatably in a defined angular position, with one of the two mirrors, so that the mirrors associated with one another rotate together about the Y axis and thus rotate the beam about a rotation point that lies on the rotation axis (X axis) of the third mirror, which rotates alone.

C. Cheever et al., "Ferrofluid Film Bearing for enhancement of rotary scanner performance", SPIE vol. 1454 Beam Deflection and Scanning Technologies (1991), pp 135–151, discloses a mirror which can be rotated about one axis and which is mounted in a Ferrofluid Film bearing.

In scanning microscopy, a sample is illuminated with a light beam in order to observe the reflected or fluorescent light emitted from the sample. The focus of an illuminating light beam is moved in a specimen plane by means of a controllable beam deflection device, generally by tilting two mirrors, the deflection axes usually being perpendicular to one another so that one mirror deflects in the X direction and the other in the Y direction. Tilting of the mirrors is brought about, for example, by means of galvanometer positioning elements. The power level of the detected light coming from the specimen is measured as a function of the position of the scanning beam. The positioning elements are usually equipped with sensors to ascertain the present mirror position.

In confocal scanning microscopy specifically, a specimen is scanned in three dimensions with the focus of a light beam.

A confocal scanning microscope generally comprises a light source, a focusing optical system with which the light of the source is focused onto an aperture (called the "excitation pinhole"), a beam splitter, a beam deflection device for beam control, a microscope optical system, a detection pinhole, and the detectors for detecting the detected or fluorescent light. The illuminating light is often coupled in via the beam splitter, which can be embodied, for example, as a neutral beam splitter or a dichroic beam splitter. Neutral beam splitters have the disadvantage that depending on the splitting ratio, a great deal of excitation light or detected light is lost.

The fluorescent or reflected light coming from the specimen travels back via the beam deflection device to the beam splitter, traverses it, and is then focused onto the detection pinhole behind which the detectors are located. Detected light that does not derive directly from the focus region takes a different light path and does not pass through the detection pinhole, so that a point datum is obtained which results, by sequential scanning of the specimen, in a three-dimensional image. A three-dimensional image is usually achieved by acquiring image data in layers, the path of the scanning light beam on or in the specimen ideally describing a meander (scanning one line in the X direction at a constant Y position, then stopping the X scan and stewing by Y displacement to the next line to be scanned, then scanning that line in the negative X direction at constant Y position, etc.). To make possible acquisition of image data in layers, the sample stage or the objective is shifted after a layer is scanned, and the next layer to be scanned is thus brought into the focal plane of the objective.

It is particularly important in scanning microscopy, in order to achieve an aberration-free image, to rotate the illuminating light beam about a rotation point located in the objective pupil as the sample is being scanned. Ideally, this condition is met for scanning both the rows and the columns, i.e. for both the X and the Y direction. Since the beam deflection device usually cannot, for space reasons, be positioned directly in the objective pupil, the rotation point located in the pupil is imaged by way of further optical systems, and the beam deflection device is positioned at the location of the image. Beam deflection devices based on two mirrors arranged one after another have the disadvantage that only one of the mirrors can be positioned at the location of the pupil image. This necessarily results in an aberration. Beam deflection devices based on a single gimbal-mounted mirror, or the previously mentioned beam deflection device known from German Unexamined Application DE 196 54 210 A1, eliminate this disadvantage; because of the greater masses to be moved, these beam deflection devices permit only a lower scanning speed.

SUMMARY OF THE INVENTION

It is an object of the present invention to provide a beam deflection device that permits fast, efficient control of a light beam and is largely maintenance-free and wear-free.

The present invention provides a beam deflection device comprising: a deflection means which is rotatable and/or pivotable about several axes, and a bearing which comprises a Ferrofluid.

It is a further object of the present invention to provide a scanning microscope which permits a high scanning speed and high accuracy.

The present invention also provides a scanning microscope comprising: an adjustable beam deflection device for deflecting a light beam, wherein the beam deflection device comprises a deflection means and a bearing, which comprises a ferrofluid.

Ferrofluids, also known as magnetofluids or magnetic liquids, are known from other sectors of technology. Ferrofluids are stable colloidal suspensions of magnetic nanoparticles in a carrier liquid. Known applications are, for example, loudspeaker cooling or low-friction sealing of rotary unions. Ferrofluids can also be used to separate nonmagnetic substances of different densities from one another. In medical technology, ferrofluids are used as contrast agents for X-ray images, and to test the permeability of vessel systems.

Because of the particular bearing system for the deflection means, the beam deflection device according to the present invention permits high deflection rates; this is also the case, in particular, when the deflection means is rotatable about two rotation axes in a kind of ball bearing. The deflection means at least partially reflects the light beam that is to be deflected. The deflection means can be embodied for this purpose, for example, as a mirror or as a partially reflective filter. In another variant, the deflection means deflects the light beam by optical refraction or by diffraction. In this context the deflection means can contain, for example, an optical grating or a prism.

In an embodiment, the deflection means is mounted rotatably about several, preferably two, axes. In particular in order to achieve telecentric imaging in scanning microscopy (rotation of the deflection means about two rotation axes that both extend through an image of the objective pupil), the two rotation axes always lie in one and the same nonstationary plane. In other words, the rotation axes do not extend askew with respect to one another, but instead always have one stationary intersection point.

In an embodiment, the deflection means is arranged in the yoke of a magnet in such a way that the ferrofluid, following the magnetic field lines, positions itself between the yoke and the deflection means. The beam deflection device is preferably embodied in such a way that the deflection means automatically centers itself.

Upon application of the magnetic field, the ferrofluid is preferably pulled back out of the interior of the yoke into slits in the yoke, there forming "sealing rings" of a kind, which then function as bearings.

In an embodiment of the beam deflection device, the deflection means comprises a control lever with which the rotational position of the deflection means is adjustable.

Preferably at least one drive means is provided with which a rotation of the deflection means can be brought about. In an embodiment, the drive means acts on the control lever.

In an embodiment, the drive means operates electromagnetically. It can contain for that purpose, for example, a coil or an electromagnet that exerts forces on a magnetic component mounted on the control lever.

In another embodiment, the deflection means is embodied as an electrostatically operating drive means. It is also possible to use any other kind of drive means, for example motors or piezo positioning elements.

In an embodiment of the beam deflection means, a monitoring means is provided with which the current rotational position of the deflection means is identifiable. In scanning microscopy, for example, a monitoring means of this kind can supply information as to which region of a sample is presently being scanned. The monitoring means preferably ascertains the rotational position of the deflection means from the deflection direction of the light beam deflected by the deflection means, and/or from the deflection direction of a monitoring light beam deflected by the deflection means. A light source preferably embodied as a laser, in particular as a semiconductor laser, can be provided for generation of the monitoring light beam. In an advantageous variant, the monitoring means comprises an optical sensor in order to identify the deflection direction of the monitoring light beam. The optical sensor can be embodied, for example, as a quadrant diode or as an array of individual detectors (e.g. diode array).

Use of the beam deflection device according to the present invention in a scanning microscope is advantageous because, as already stated, in that context it simultaneously makes possible both telecentric imaging in both scanning directions and a high scanning speed in both scanning directions.

In an embodiment, the scanning microscope is embodied as a confocal scanning microscope.

BRIEF DESCRIPTION OF THE DRAWINGS

The subject matter of the invention is depicted schematically in the drawings and will be described below with reference to the Figures, identically functioning components being labeled with the same reference characters. In the drawings:

FIG. 1b shows a beam deflection device according to the present invention in a Y-Z section;

FIG. 1c shows a beam deflection device according to the present invention in a view onto the Z plane.

DETAILED DESCRIPTION OF THE INVENTION

Figure 1A:
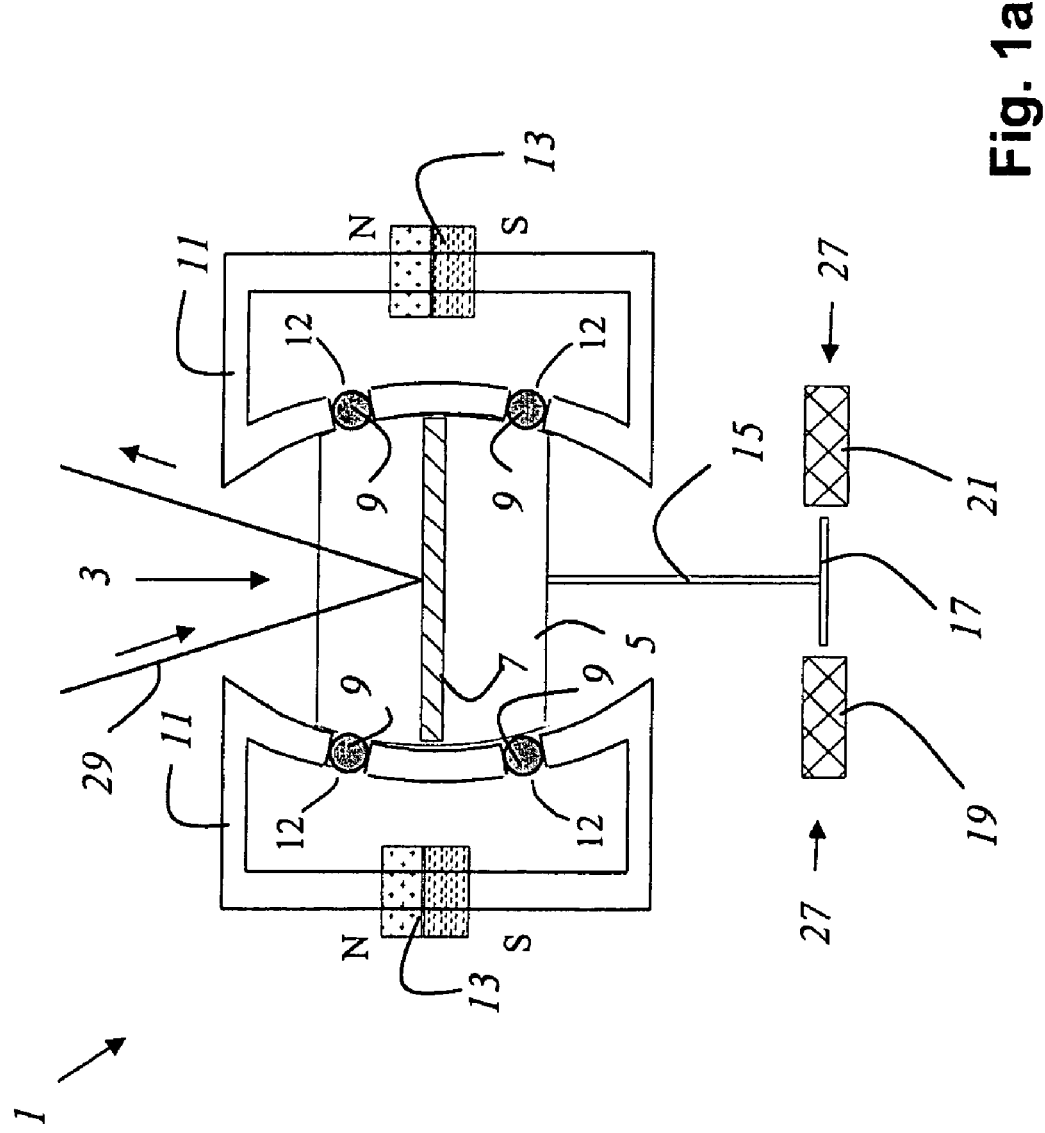
FIG. 1a shows a beam deflection device according to the present invention in an X-Z section.

FIG. 1a shows a beam deflection device 1 according to the present invention in an X-Z section. Beam deflection device 1 comprises a deflection means 3 that is made up of a nonmagnetic mirror support 5 and a mirror 7 mounted thereon. Nonmagnetic mirror support 5 floats in a ferrofluid 9 and is located inside a yoke 11 of an annular magnet 13; as a result of the magnetic field, the ferrofluid collects in the gap between deflection means 3 and yoke 11 to form bearing 12. The magnetic field of annular magnet 13 exerts a force on the ferrofluid with magnetic flux B, so that the density of the magnetic field lines likewise imposes a dense change on the ferrofluid and thus a pressure on mirror support 5, so that mirror 5 centers itself in the middle.

Deflection means 3 comprises a control lever 15 at whose end is mounted a magnetic component 17 that is cross-shaped. The beam deflection device comprises four coils 19, 21, 23, 25 as drive means 27. With coils 19–25, a force can be exerted on magnetic component 17, and the rotational position of deflection means 3 can thus be adjusted depending on the electrical activation of coils 19–25.

The arrangement of coils 19–25 with respect to the cross-shaped magnetic component 17 is shown in FIG. 1c.

The deflection direction of a light beam 29 is adjustable in the manner recited.

FIG. 1b schematically shows a monitoring means 31 with which the rotational position of deflection means 3 can be ascertained. Monitoring means 31 comprises a semiconductor laser 33 that emits a monitoring light beam 35 directed onto the back side of mirror 7. Monitoring light beam 35 reflected from the back side of mirror 7 is detected with an optical sensor 37 that is embodied as a four-quadrant diode 39. From the location at which monitoring light beam strikes four-quadrant diode 39, conclusions can be drawn as to the rotational position of deflection means 3.

Figure 2:
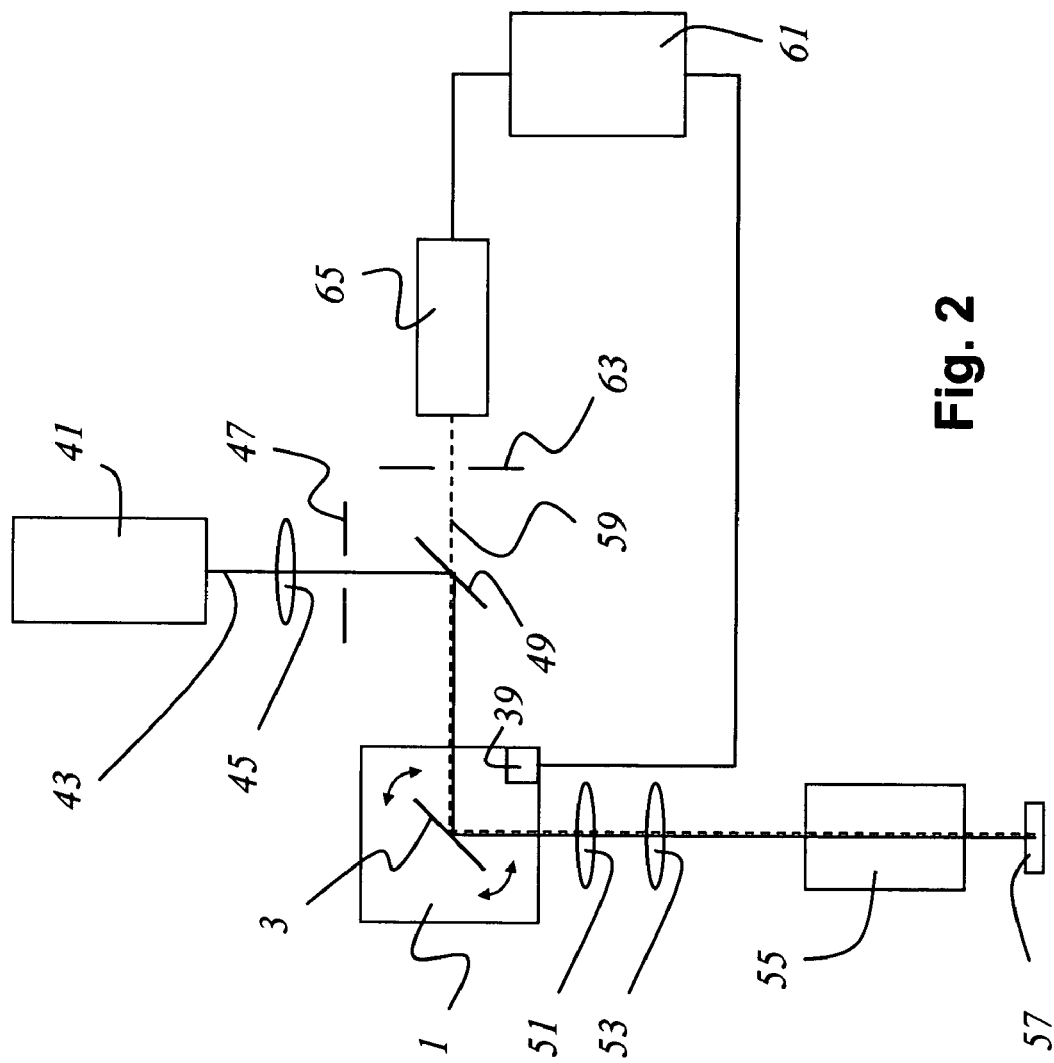
FIG. 2 shows a scanning microscope according to the present invention.

FIG. 2 shows a scanning microscope according to the present invention having a light source 41 that emits an illuminating light beam 43 which is focused with optical system 45 onto illumination pinhole 47. Illuminating light beam 43 passes through illumination pinhole 47 and is directed by main beam splitter 49 to beam deflection device 1, which contains deflection means 3 described with reference to FIG. 1. Beam deflection device 1 guides the illuminating light beam, through scanning optical system 51 and tube optical system 53 and through microscope objective 55, over sample 57 in two dimensions. Detected light 59 proceeding from the sample travels along the same light path, i.e. through microscope optical system 55, tube optical system 53, scanning optical system 51, and beam deflection device 1, back to main beam splitter 49, traverses the latter and the downstream detection pinhole 63, and strikes detector 65, which generates electrical signals proportional to the power level of the detected light that are conveyed to a processing unit 61. Data concerning the rotational position of deflection means 3 are likewise conveyed from quadrant diode 39 to processing unit 61, which associates those data with the corresponding detected light data.

The mutually associated data can be displayed, for example using a PC (not shown in this Figure), as an image of sample 57.

The invention has been described with reference to a particular exemplary embodiment. It is self-evident, however, that changes and modifications can be made without thereby leaving the range of protection of the claims below.

What is claimed is:

1. An adjustable beam deflection device for deflecting a light beam comprising:
   a deflection means which is rotatable and/or pivotable about several axes, and
   a ferrofluid disposed inside a yoke of an annular magnet, wherein the deflection means is disposed on a nonmagnetic support, at least a portion of the nonmagnetic support floating in the ferrofluid.

2. The beam deflection device as defined in claim 1, wherein the deflection means is rotatable and/or pivotable about two axes in a kind of ball bearing.

3. The beam deflection device as defined in claim 1, wherein the deflection means at least partially reflects the light beam.

4. The beam deflection device as defined in claim 1, wherein the deflection means deflects the light beam by refraction.

5. The beam deflection device as defined in claim 1, wherein the deflection means comprises a mirror and/or an optical grating and/or a prism and/or an at least partially reflective coating.

6. The beam deflection device as defined in claim 1, whereby the beam deflection device is used in a scanning microscope.

7. The beam deflection device as defined in claim 1, wherein the ferrofluid is configured to automatically center the deflection means.

8. The beam deflection device as defined in claim 1, wherein the deflection means comprises a control lever with which the rotational position of the deflection means is adjustable.

9. The beam deflection device as defined in claim 1, further comprising at least one drive means for rotating and/or pivoting the deflection means.

10. The beam deflection device as defined in claim 9, wherein the drive means acts on a control lever.

11. The beam deflection device as defined in claim 10, wherein the drive means operates electromagnetically and/or electrostatically.

12. The beam deflection device as defined in claim 10, wherein the drive means comprises a coil and/or an electromagnet.

13. The beam deflection device as defined in claim 1, further comprising a monitoring means for identifying the current rotational position of the deflection means.

14. The beam deflection device as defined in claim 13, wherein the monitoring means ascertains the rotational position from the deflection direction of the light beam deflected by the deflection means, and/or from the deflection direction of a monitoring light beam deflected by the deflection means.

15. A scanning microscope comprising an adjustable beam deflection device for deflecting a light beam, the beam deflection device comprising a deflection means rotatable and/or pivotable about several axes and a ferrofluid disposed inside a yoke of an annular magnet, wherein the deflection means is disposed on a nonmagnetic support, at least a portion of the nonmagnetic support floating in the ferrofluid.

16. The scanning microscope as defined in claim 15, wherein the deflection means is rotatable and/or pivotable about two axes in a kind of ball bearing.

17. The scanning microscope as defined in claim 15 further comprising: a drive means for rotating and/or pivoting the deflection means.

* * * * *